United States Patent [19]

Kusano

[11] Patent Number: 5,479,396
[45] Date of Patent: Dec. 26, 1995

[54] REDUNDANT SYSTEM HAVING SIGNAL PATH OPERATION FUNCTION

[75] Inventor: Toshihiko Kusano, Tokyo, Japan

[73] Assignee: NEC Corporation, Tokyo, Japan

[21] Appl. No.: 301,059

[22] Filed: Sep. 6, 1994

[30] Foreign Application Priority Data

Sep. 7, 1993 [JP] Japan ................................. 5-222374

[51] Int. Cl.$^6$ ........................... H04J 3/14; H04L 1/00
[52] U.S. Cl. ................ 370/16; 370/68.1; 340/825.01; 340/827; 379/2; 379/273; 379/279; 455/8
[58] Field of Search ................ 370/16, 16.1, 14, 370/54, 53, 68.1; 379/2, 221, 272, 273, 275, 276, 278, 279; 371/8.2; 340/825.01, 825.03; 455/8

[56] References Cited

U.S. PATENT DOCUMENTS

| | | | |
|---|---|---|---|
| 5,010,550 | 4/1991 | Hirata | 455/8 |
| 5,081,619 | 1/1992 | Nagata | 371/8.2 |
| 5,210,740 | 5/1993 | Anzai et al. | 370/16 |
| 5,268,897 | 12/1993 | Komine et al. | 455/8 |
| 5,333,187 | 7/1994 | Hiraiwa et al. | 379/279 |

*Primary Examiner*—Alpus Hsu
*Assistant Examiner*—Ricky Q. Ngo
*Attorney, Agent, or Firm*—Whitham, Curtis, Whitham & McGinn

[57] ABSTRACT

A redundant system includes a redundant structure and a selector of the output signals of the redundant structure the selector further including a selection/operation signal converter and a path operation signal processor provided in each circuit package. The signal converter converts selection signals of the selector into a path operation signal indicative of operation or non-operation of each signal path in each of the parallel connected systems. The signal processor transfers the path operation signal from a downstream circuit package to an upstream circuit package and judges path operation condition of the signal paths passing through each circuit package based on the transferred oath operation signal. Using the judgement, each circuit package can perform on/off control of the indication lamp by itself.

20 Claims, 5 Drawing Sheets

REDUNDANT SYSTEM HAVING SIGNAL PATH OPERATION FUNCTION

BACKGROUND OF THE INVENTION

1. Field of the Invention

The present invention relates to a system including a redundant structure and, more particularly, to a redundant system comprising a plurality of systems interconnected in parallel and a selector for selecting an output of any of those systems.

2. Description of the Prior Art

In a switching system of a communication network, interruption of the switching function due to any failure provides a very severe problem. Against this, a dual redundant structure is employed to improve the reliability of the system. In such a dual redundant structure, two systems of the same configuration for performing the same processing are parallel connected (hereinafter, referred to as #0 and #1 systems), and further a redundancy switch is provided for selecting one of the output signals therefrom. Hereby, even if there is detected any failure in one system, the redundancy switch immediately switches to another system to maintain continuity of processing.

Since such a switching system generally switches many signals, it requires the same number of the redundancy switches as that of the signals to ensure input/output operations. Many signals inputted into the switching system are halved respectively and are concurrently fed into the #0 system and the #1 system. Any one of multiple corresponding output signals of the #0 system and the #1 system is selected by the corresponding redundancy switch and is output. Therefore, many complicated signal routes are formed in the #0 system and the #1 system according to the selection condition of the redundant switches.

Referring to FIG. 1, there is illustrated a schematic block diagram showing the simplified structure of a conventional transmission apparatus. As illustrated in the figure, a reception processor 101 receives an input signal and a signal branching portion 102 branches the input signal into two flows to transfer them to two systems of #0 and #1, respectively. The #0 system is comprised of electronic circuit packages 103A and 104A connected in cascade while the #1 system is comprised of electronic circuit packages 103B and 104B connected likewise in cascade. It should be noted that each illustrated circuit package is simplified for description.

A #0 signal and the corresponding #1 signal output respectively from the circuit packages 104A and 104B are selected by the redundancy switch 105, and are output through a transmission processor 106 to the outside. The redundancy switch 105 switches any system to a normal one when any failure is detected as described above.

A selection signal (SEL) indicative of the selection status of the redundancy switch 105 is output to a central controller 107 of the transmission apparatus 1. Actually, the redundancy switch 105 is provided by the number of the signal paths and hence the central controller 107 collects the selection signals from all the redundancy switches in the transmission apparatus 1.

It is assumed that one of the redundancy switches selects the corresponding output signal of the #0 system. The central controller 107 judges from the associated data signal that the signal path of the #0 is at an operational state, and determines that the circuit package 103A of the #0 system is at "operation" while the circuit package 103B of the #1 system is at "non-operation". The operation/non-operation state is stored in an operation information memory ( not shown ) in the central controller 107. The central controller 107 controls operation indication lamps for the circuit packages 103A and 103B which are turned on and off. More specifically, the lamp for the circuit package 103A is turned on when the #0 system at an operational state while the other lamp for the circuit package 103B is turned off when the #1 system at a non-operational state.

It is assumed herein that the redundancy switch 105 is switched over owing to any cause.. The central controller 107 redetermines the circuit package 103A of the #0 system to be at "non-operation" while the circuit package 103B of the #1 system to be at "operation". With the redetermination, the operation information memory in the central controller 107 is updated in its contents, and the operation indication lamp for the circuit package 103A of the #0 system is turned off while the operation indication lamp for the circuit package 103B of the #1 system is turned on. The circuit package 103B, the lamp for which is turned off, is at a non-operation state and hence is made removable for repair or inspection.

However, in the aforementioned conventional system, the central controller 107 collects the selection signals SEL from all redundancy switches 105 at all times and then the operation/non-operation of each circuit package is determined on the basis of the collected selection signals SEL. This causes the central controller to be severely loaded and the processing time from the collection of the selection signals SEL to setting of operation/non-operation is increased. Further, since the central controller controls a lamp for each circuit package, connection lines are needed between the central controller and circuit packages which causes the wiring of the transmission apparatus to be complicated. These difficulties increase as the number of output signals to be processed is increased.

The above and other objects, features and advantages of the present invention will become more apparent from the following description when taken in conjunction with the accompanying drawings in which preferred embodiments of the present invention are shown by way of illustrative example.

SUMMARY OF THE INVENTION

It is an object of the present invention to provide a redundant system capable of setting of operation/non-operation of each circuit package in a short time.

It is another object of the present invention to provide a redundant system capable of setting operation/non-operation of each circuit package without complicated wiring.

To achieve the above objects, a redundant system according to the present invention is adapted such that path operation information indicative of operation/non-operation of a signal path is successively transferred through a plurality of circuit packages constituting each system of a redundant structure, and each circuit package judges a path operation condition of the signal paths passing through the circuit package according to the transferred path operation information.

The redundant system according to the present invention is comprised of the redundant structure and a selector, and further comprised of a selection/operation signal converter and a path operation signal processor provided in each circuit package. The signal converter generates path operation information indicative of operation or non-operation of each signal path in each of the parallel connected systems, based on selection information indicative of selection or non-selection of each signal path in the selector. The signal processor transfers the path operation information from a downstream circuit package to an upstream in the reverse direction to the stream of associated signal paths and judges path operation condition of the signal paths passing through each circuit package based on the transferred path operation information.

More specifically, the signal processor is preferably comprised of a collecting portion for collecting the path operation information from a plurality of circuit packages located on the downstream side with respect to the data signal, a transferring portion for transferring the path operation information to upstream circuit packages, and an OR circuit for calculating a logical OR of the values of the collected path operation information. Further an indication lamp is provided in each circuit package to indicate the operation status of the circuit package according to the logical result of the judgement means.

DESCRIPTION OF THE PREFERRED EMBODIMENTS

In the following, there will be described in detail preferred embodiments of the present invention with reference to the accompanying drawings.

Figure 1:
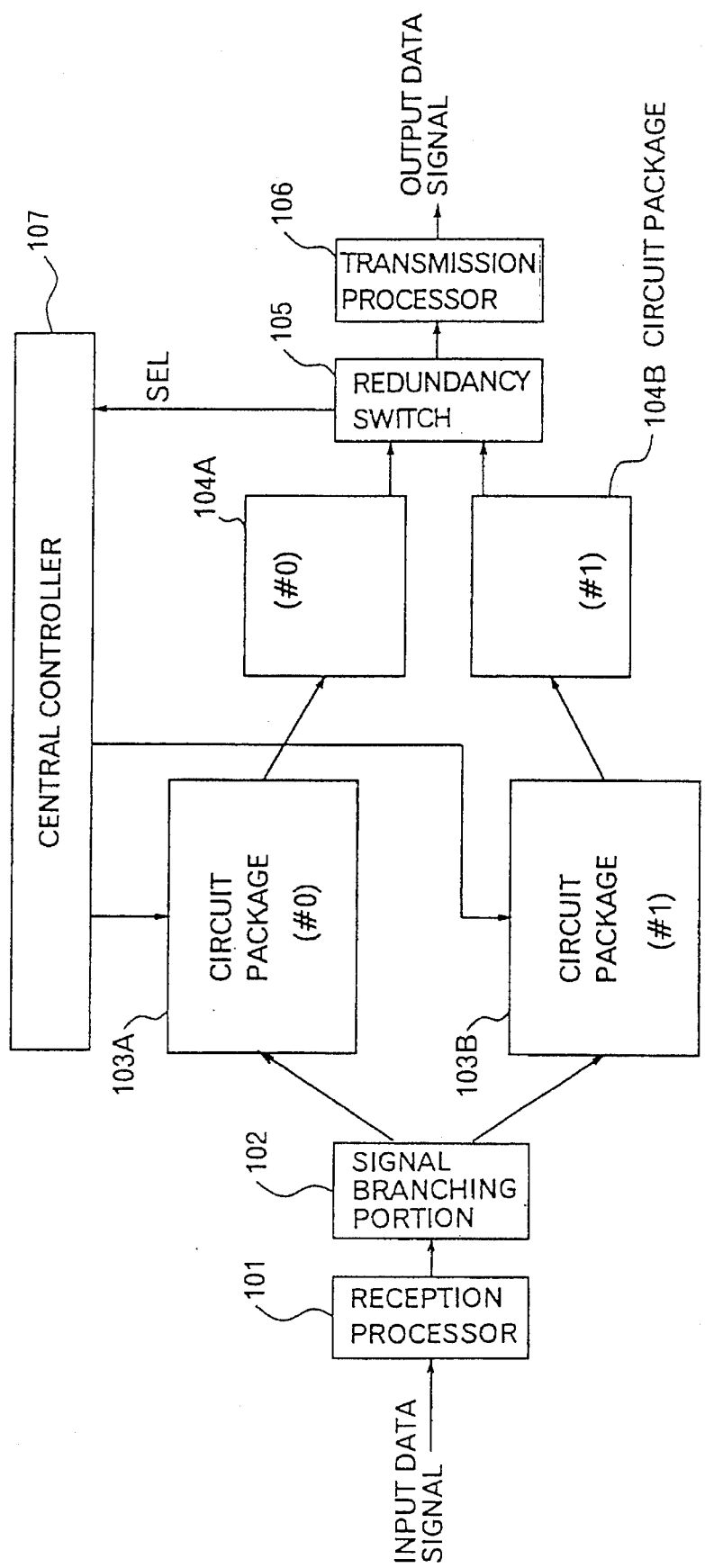
FIG. 1 is a schematic block diagram illustrating a simplified structure of a conventional transmission apparatus.
Figure 2:
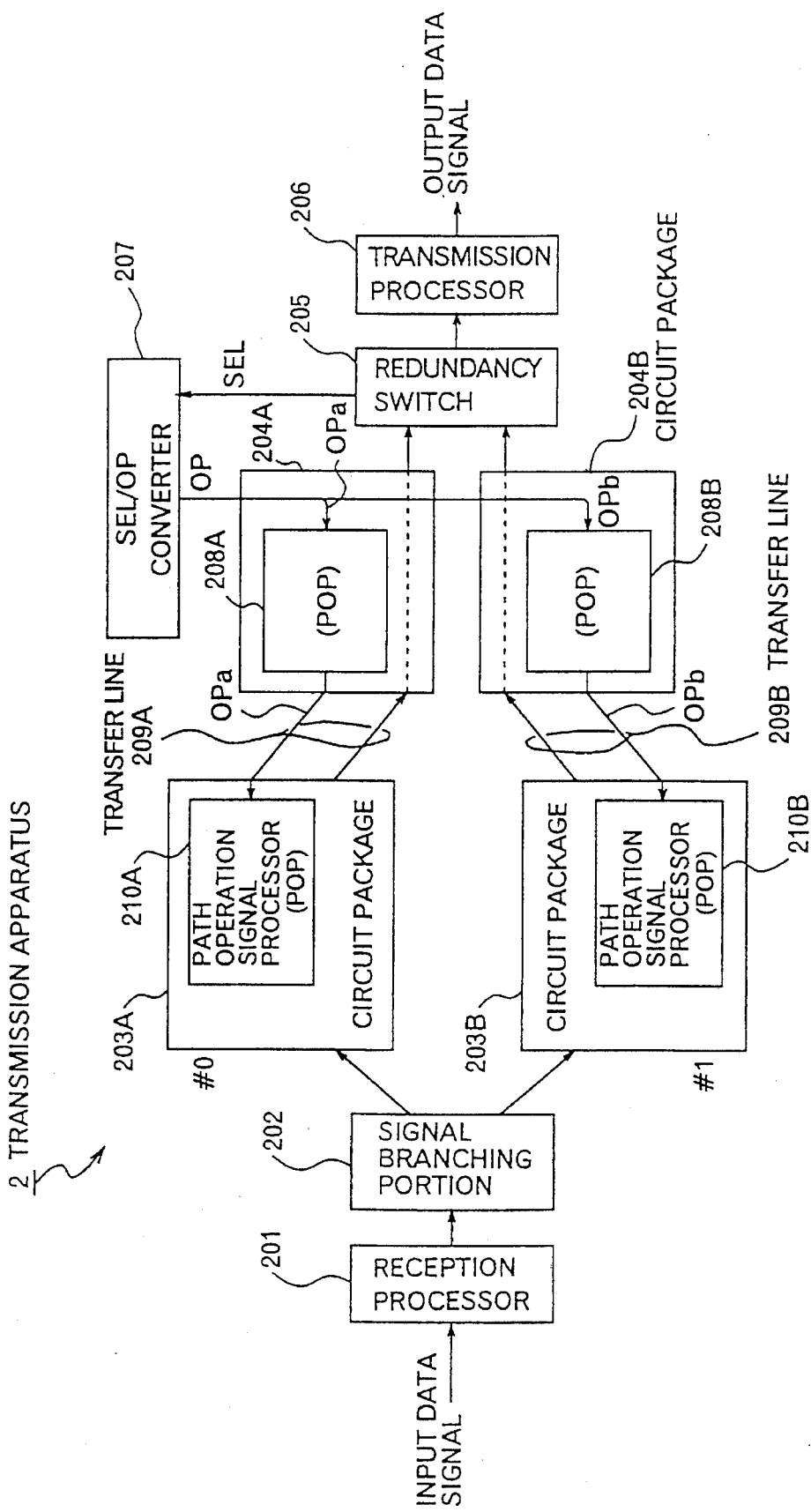
FIG. 2 is a block diagram illustrating a simplified structure of a transmission apparatus according to an embodiment of the present invention.

As illustrated in FIG. 2, a transmission apparatus 2 according to the present embodiment is comprised of a dual redundant structure. An input data signal received by a reception processor 201 is divided through a signal branching portion 202 into two identical signals which are fed into a #0 system and a #1 system, respectively. The #0 system is comprised of electronic circuit packages 203A and 204A connected in cascade. Similarly the #1 system is comprised of electronic circuit packages 203B and 204B. As described later, each circuit package includes a path operation signal processor POP to set an operation status by itself.

The data signal of the #0 system is transmitted from the circuit package 203A to the circuit package 204A and likewise the data signal of the #1 system is transmitted from the circuit package 203B to the circuit package 204B, and both signals are sent from the circuit packages 204A and 204B to a redundancy switch 205, respectively. The redundancy switch 205 selects any one of the two data signals and transmits the selected signal to the outside through a transmission processor 206.

Figure 3:
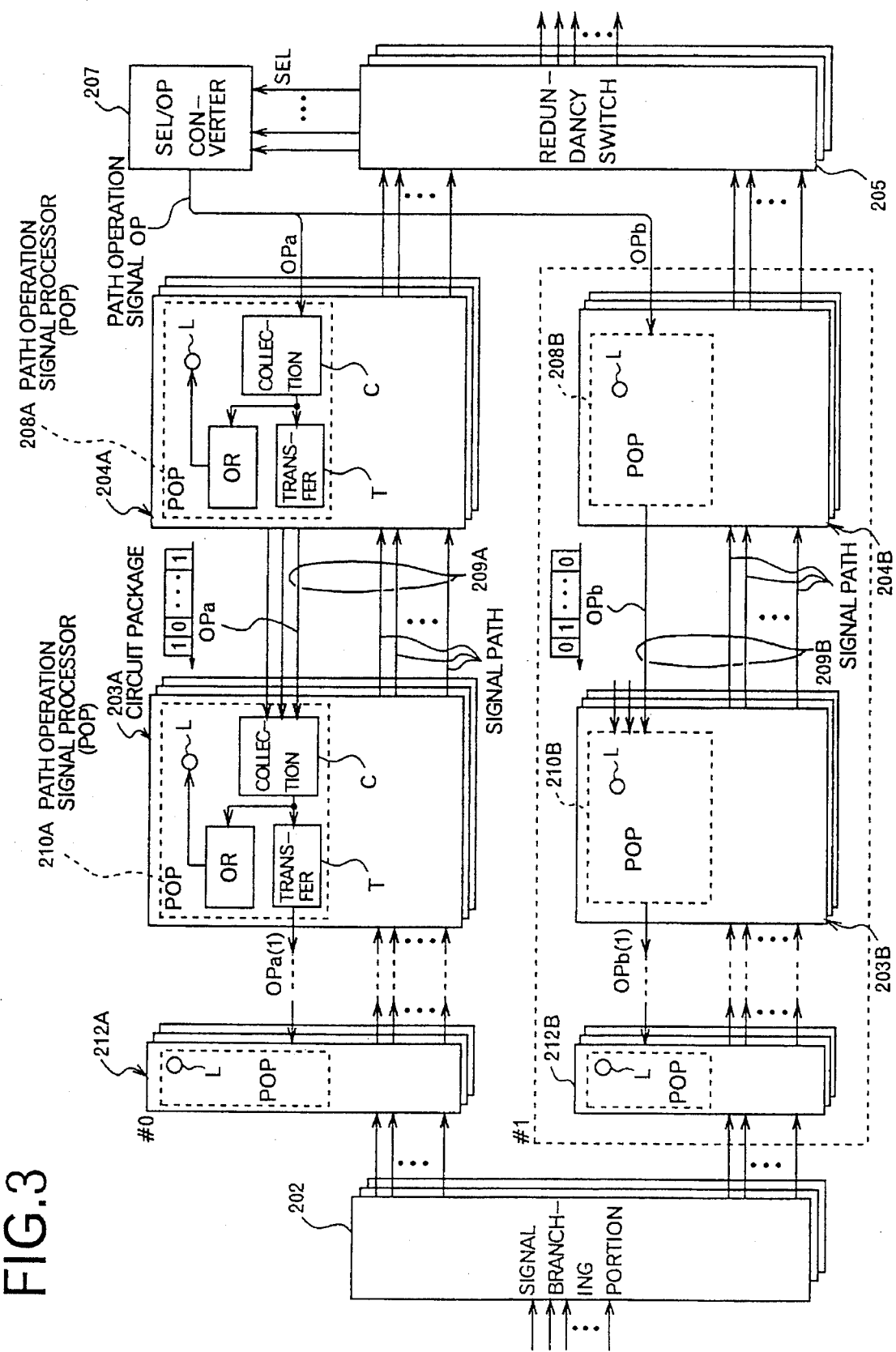
FIG. 3 is a block diagram illustrating in detail a structure of the embodiment illustrated in FIG.2.
Figure 4:
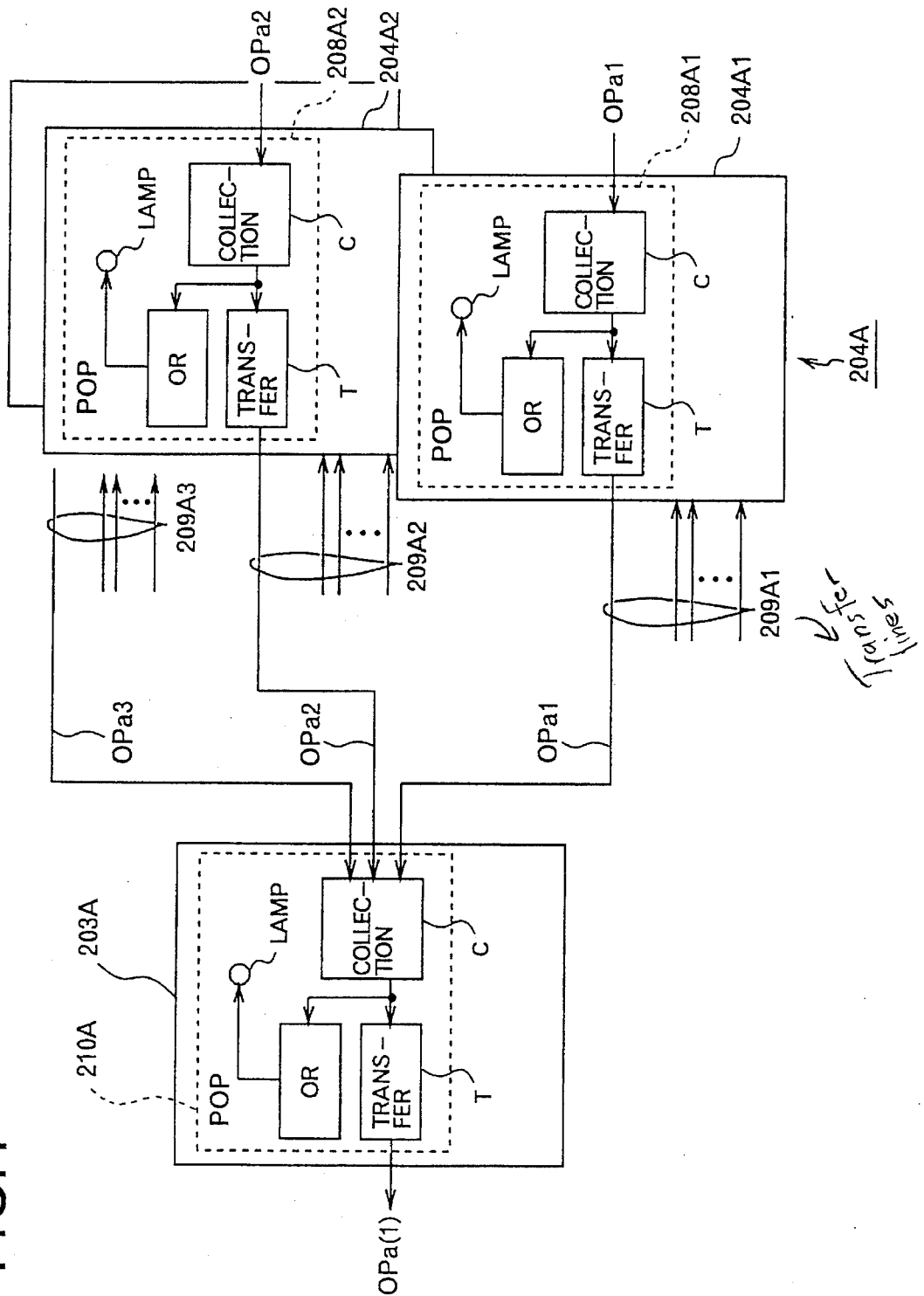
FIG. 4 is a block diagram illustrating in detail how path operation signals are collected by a collection portion of a path operation signal processor 210A.

Each circuit package and the redundancy switch 205 are illustrated in a simplified manner, and actually they are constructed with a plurality of circuit packages and a plurality of redundancy switches respectively, as illustrated in FIG. 3 or FIG. 4. In FIG. 2, for brevity illustrated is one signal path for each of the #0 and #1 systems, and one redundancy switch for selecting any of the signal paths.

A selection signal SEL indicative of a selection status of the redundancy switch 205 is transmitted to a signal converter 207 in which the selection signal SEL is converted to a path operation signal OP comprising a #0 system path operation signal OPa and a #1 system path operation signal OPb. The #0 system path operation signal OPa and the #1 system path operation signal OPb are sent to path operation signal processors 208A and 208B each provided in the circuit packages 204A and 204B, respectively. Further, they are transferred from the path operation signal processors 208A and 208B through transfer paths 209A and 209B to path operation signal processors 210A and 210B provided respectively in the circuit packages 203A and 203B.

For the transfer paths 209A and 209B, there is no need of separately providing respective lines for transfer of the data signals and the path operation signals if each circuit package is to achieve bi-directional transmission of signals. More specifically, a bi-directional transmission line may be employed which is capable of transferring the data signals from the circuit packages 203A and 203B to the circuit packages 204A and 204B and of transferring the path operation signals OPa and OPb in the opposite direction. Otherwise, in the case where a data signal includes a blank data field, the blank data field may be used to transfer the path operation signals OPa and OPb. It is natural that dedicated transmission lines may be separately provided for transfer of the path operation signals OPa and OPb.

The #0 system path operation signal OPa consists of respective values corresponding to a plurality of signal paths passing through the circuit package 204A. Specifically, among those signal paths a signal path selected by the redundancy switch 205 is set to '1', i.e., "operation", while a signal path not selected by the same is set to '0', i.e., "non-operation". Since the #0 system and the #1 system are alternative, the #1 system path operation signal OPb consists of reversed values to those of the #0 system path operation signal OPa.

The path operation signal processors 208A, 208B, 210A, and 210B judge the operation statuses of the circuit packages 204A, 204B, 203A, and 203B, respectively, and perform predetermined control. In the case, for example, where all signal paths passing through the circuit package 203A are of "non-operation", in other words, any value of the path operation signal OPa is '0', the path operation signal processor 210A turns off an operation indication lamp for the circuit package 203A. Further, provided the path operation signal OPa includes at least one "1", it indicates that at least one of the signal paths passing through the circuit package 203A has been selected by the redundancy switch 205, and so the path operation signal processor 210A turns on the operation indication lamp. It should be noted that the operation indication signal may be used as a signal for maintenance.

There will be described in detail the path operation signal, and the structure and operation of the path operation signal processor with reference to FIG. 3.

Referring to FIG. 3, a block diagram is provided illustrating in further detail the structure of the present embodiment. Identical symbols shall be applied to circuit portions having identical functions to those illustrated in FIG. 2.

The #0 system includes a plurality of circuit packages (herein, 212A, 203A, and 204A are illustrated in an exemplified manner) connected in cascade, and path operation signal processors (POP) provided in the circuit packages, respectively. The #1 system is also constructed in the same manner (herein, 212B, 203B, and 204B are illustrated.).

A path operation signal processor (POP) is comprised of a collection portion (C) for collecting path operation signals from the circuit packages located downstream with respect to the data signal, a transfer portion (T) for transferring a path operation signal to upstream circuit packages, an OR operation portion for calculating a logical OR of the values of the collected path operation signals, and an operation indication lamp (L) being turned on and off depending upon a result of the OR operation portion.

In the following, the path operation signal processor 210A of the circuit package 203A will be described as an example. The path operation signal processor 210A receives a path operation signal OPa from a path operation signal processor 208A provided in a downstream circuit package 204A. The path operation signal OPa comprises a string of values '1' or '0' indicative of operation or non-operation of signal paths in a transfer line 209A. As illustrated in the figure, with OPa=(1,0, . . . ,1), the first signal path is of "operation" and the second signal path of "non-operation". Accordingly, the corresponding path operation signal OPb in the #1 system consists of inverted values of the first signal path, i.e., OPb=(0,1, . . . ,0). In other words, the first signal path is of "non-operation", and the second signal path of "operation".

The collection portion (C) of the path operation signal processor 210A receives the path operation signals from all circuit packages to which the circuit package 203A transmits the data signals via the signal paths. (Detailed description will be done with reference to FIG. 4.) More specifically, path operation signals are collected from all downstream circuit packages connected with the circuit package 203A. These path operation signals are inputted to the OR operation portion, and are transferred to upstream circuit packages connected with the circuit package 203A through the transfer portion (T). The OR operation portion calculates a logical OR of the values of all collected path operation signals. Provided the path operation signals contains the value "1" even only one therein, the OR operation portion issues "1" whereby at least a signal path is judged to have been selected by the redundancy switch 205. Hereby, the operation indication lamp (L) is controlled to be turned on. In contrast with this, provided the values of all path operation signals are "0", the OR operation portion issues "0". Hereby, no signal path is judged to be selected by the redundancy switch 205, whereby the operation indication lamp (L) is controlled to be turned off. The output signal of the OR operation portion may be used as a part of signals for maintenance.

Referring to FIG. 4, a block diagram is provided in which there is illustrated in detail how the path operation signals are collected by the collection portion (C) of the path operation signal processor 210A. It is assumed that the circuit package 204A comprises a plurality of circuit packages 204A1, 204A2, . . . , among which three circuit packages 204A1–204A3 are connected with the circuit package 203A through transfer lines 209A1–209A3, respectively.

The transfer portions of the path operation signal processor 208A1–208A3 transfer path operation signals OPa1–OPa3 to the path operation signal processor 210A of the circuit package 203A through the transfer lines 209A1–209A3. The path operation signals OPa1–OPa3 represent, as described above, the operation status of the signal paths passing through the transfer lines 209A1–209A3. Such path operation signals OPa1–OPa3 are collected by the collection portion (C) in the path operation signal processor 210A, and the OR operation portion judges the signal path operation status of the circuit package 203A using the collected path operation signals.

The structure and operation of the path operation signal processor 210A are similarly applied also to other path operation signal processors. Thus, the path operation signals OPa and OPb issued from the SEL/OP converter 207 go oppositely to a data signal flow and are sequentially transferred from the circuit packages 204A and 204B to the circuit packages 203A and 203B and further to upstream circuit packages. By transferring the path operation signals OPa and OPb in the opposite direction to the data signal stream, each circuit package can judge the operation status of the signal paths therein to perform control of the operation indication lamp (L).

Figure 5:
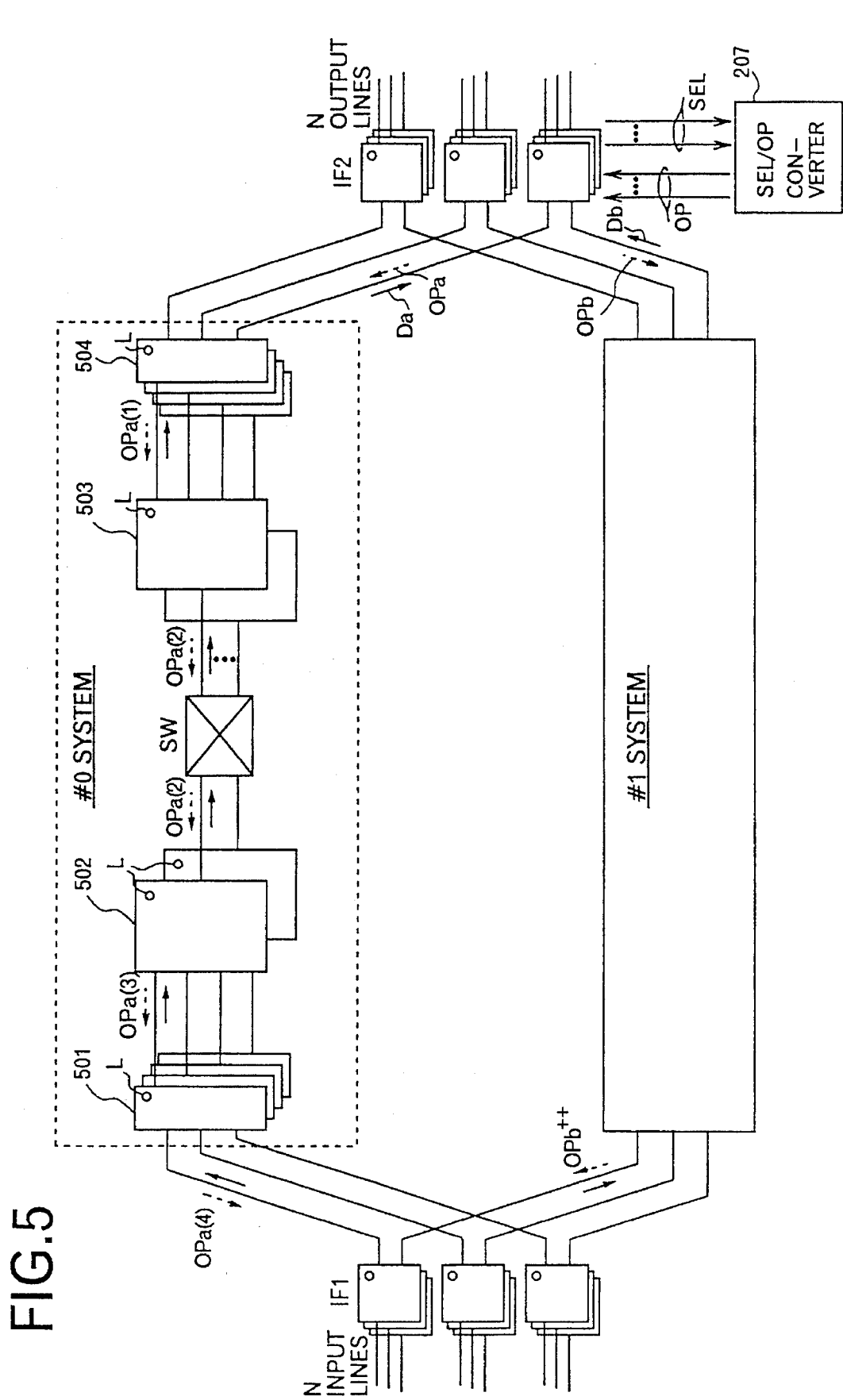
FIG. 5 is a block diagram illustrating a schematic structure of a switching system according to another embodiment of the present invention.

Referring to FIG. 5, a block diagram is provided in which there is illustrated a schematic structure of a switching system according to another embodiment of the present invention. In the present embodiment, the signal branching portion 202 illustrated in FIG. 2 is incorporated in each package of interface IF1, and the redundancy switch 205 is incorporated in each package of interface IF2. A #0 system includes, in the direction of a data flow, packages 501 and 502, a switch SW, and packages 503 and 504, all connected in cascade.

For example, four packages 501 are connected with each package 502, and likewise four packages 504 are connected with each package 503. A #1 system is also constructed in the same manner. Each package 501 is connected with three packages of the interface IF1 and three input lines are connected with each package of the interface IF1, and one signal branching portion 202 is provided for each input line. More specifically, N (integer number) input lines are branched by N signal branching portions 202 into two signal flows and respective data signals are transmitted to the #0 system and #1 system. Similarly, each package 504 is connected with three packages of the interface IF2. Further, three output lines are connected with each package of the interface IF2 and one redundancy switch 205 is provided corresponding to each output line. More specifically, N redundancy switches 205 select N data signals outputted from each of the #0 and #1 systems, respectively, and transmit them to the outside through N output lines.

It should be noticed that two arbitrary packages in a connection relation in FIG. 5 ( e.g., packages 503 and 504 or a package 504 and a package of interface IF2 ) correspond to the circuit packages 203A and 204A in FIGS. 2 and 3.

A SEL/OP converter 207 receives selection signals from the N redundancy switches of the interface IF2 and converts these selection signals SEL into a path operation signal OP comprising path operation signals OPa and OPb for each package of the interface IF2. The path operation signal OPa goes upstream through the flow of a data signal Da, and in other words, is outputted from the IF2 packages to corresponding packages 504. The path operation signal OPb is similarly transmitted to the #1 system.

As described previously, the path operation signal OPa is collected in the path operation signal processor (POP) in the package 504 and further a path operation signal OPa(1) is transmitted to a corresponding package 503. The path operation signal OPa(1) indicates operation status (operation or non-operation) of signal paths between the packages 504 and the corresponding packages 503. Further, the path operation signal OPa(2) is transferred from the package 503 to the corresponding package 502 through the switch SW, and from the package 502 the path operation signal OPa(3) is transferred to the corresponding package 501.

The path operation signal OPa of the #0 system and the path operation signal OPb of the #1 system are sequentially transferred oppositely to the data signal and the operation status of the signal path is judged in each package. As described previously, an operation indication lamp (L) for a package is controlled to be turned on and off depending upon the operation status of the associated signal paths.

Thus, even in such a redundant structure as in the present embodiment where many packages are provided and many signal paths are dynamically selected and operated in complicated combinations, any package whose operation indication lamp (L) is turned off, indicates a fact that all signal paths passing through that package are not operating and hence is removable for repair and inspection.

Such a method of determining an operation status of any circuit package is of dispersion control where a path operation signal OP indicative of operation/non-operation is transferred oppositely to a data signal for each path and an operation status is set in each circuit package, differing from such concentrated control by a central control portion as in prior art, so that any load on the central control portion is sharply reduced.

The present invention is not limited to the aforementioned embodiments. The present invention is applicable to redundant systems such as transmission systems and exchange systems whatever the numbers of input and output lines to and from any redundant system.

Although in the aforementioned embodiments the dual redundant systems are exemplary described, the present invention is not limited thereto. The present invention, which is to transfer a path operation signal OP for each path, is applicable not only to the dual redundant systems but also to general N+1 redundant systems. Further, the present invention is applicable even to redundant systems in which a plurality of redundancy switches 205 are completely independently operated and no mutual relation exists among selected systems, and manifests the identical effects to the aforementioned redundant systems.

In accordance with the redundant system of the present invention, as described above, path operation information indicative of operation/non-operation of any signal path is sequentially transferred through a plurality of circuit packages which constitute each system of the redundant structure, and each circuit package judges path operation status by itself in conformity with the path operation information.

It is hereby ensured that the operation status of any signal path is grasped for each circuit package so as to turn on an operation indication lamp and the operation/non-operation of each circuit package is set in a short time. Although in the prior art a central control portion executes operation control collectively, in the present invention operation control is executed in each circuit package in a dispersed manner by permitting path operation information to flow through each redundant system.

I claim:

1. A redundant system comprising:
   a redundant structure having an output side, said redundant structure comprising:
      a plurality of parallel connected systems each including a plurality of circuit packages through which signal paths are formed; and
      a selector connected to said signal paths provided on the output side of said redundant structure,
      the selector selecting a signal path from one of said signal paths formed in the parallel connected systems and generating selection information indicative of one of selection and non-selection of each signal path;
   generating means for receiving said selection information indicative of one of selection and non-selection of each signal path and for generating path operation information indicative of one of operation and non-operation of each signal path in each of the parallel connected systems, based on said selection information indicative of one of selection and non-selection of each signal path generated by the selector; and
   control means provided in each said circuit package in each of the parallel connected systems, for transferring the path operation information from a first circuit package to a second circuit package in a direction reverse to that of a flow of associated signal paths and for judging path operation condition of the signal paths passing through each circuit package based on the transferred path operation information.

2. The redundant system according to claim 1, wherein the control means comprises:
   collecting means for collecting the path operation information from a plurality of circuit packages located on a first side with respect to the signal;
   transferring means for transferring the path operation information to predetermined ones of said circuit packages;
   judgement means for calculating a logical OR of the collected path operation information; and
   indication means for indicating an operational status of the associated circuit package according to a logical result of the judgement means.

3. The redundant system according to claim 1, wherein:
   said signal paths include transfer lines for connecting circuit packages;
   any two circuit packages connected in cascade by a transfer line in each of the parallel connected systems transfer signals from a second circuit package of said any two circuit packages to a first circuit package of said any two circuit packages via the transfer line, and transfer the path operation information from the first circuit package to the second circuit package via another transfer line.

4. The redundant system according to claim 3, wherein the transfer line includes a bi-directional line.

5. The redundant system according to claim 3, wherein the transfer line comprises at least one first transfer line for the signals and at least one second transfer line for the path operation information.

6. In a redundant system comprising:
   a redundant structure having an output side, said redundant structure comprising:
      a plurality of parallel connected systems each including a plurality of circuit packages through which signal paths are formed; and
      a selector connected to said signal paths provided on the output side of said redundant structure,
      the selector selecting a signal path from one of said signal paths formed in the parallel connected systems and generating selection information indicative of one of selection and non-selection of each signal path;
   a method of path operation comprising the steps of:
      generating path operation information indicative of one of operation and non-operation of each signal path in each of the parallel connected systems, based on said selection information indicative of one of selection and non-selection of each signal path generated by the selector;

transferring the path operation information from a first circuit package to a second circuit package in a direction reverse to that of a flow of associated signal paths in each of the parallel connected systems; and judging path operation condition of the signal paths passing through each circuit package based on the transferred path operation information.

7. The method according to claim 6, wherein the step of transferring comprises:

collecting the path operation information from a plurality of circuit packages located on a first side with respect to the signal; and transferring means for transferring the path operation information to predetermined ones of said circuit packages.

8. The method according to claim 6, wherein the step of judging comprises a step of calculating a logical OR of the transferred path operation information.

9. The method according to claim 7, wherein the step of judging comprises a step of calculating a logical OR of the collected path operation information.

10. The method according to claim 6, further comprising the step of indicating the operation status of the associated circuit package according to a result of the judging step.

11. The method according to claim 9, further comprising the step of indicating the operation status of the associated circuit package according to a result of the judging step.

12. The method according to claim 6, wherein said signal paths include transfer lines for connecting circuit packages;

any two circuit packages connected in cascade by a transfer line in each of the parallel connected systems transfer signals from a second circuit package of said any two circuit packages to a first circuit package of said any two circuit packages via the transfer line, and transfer the path operation information from the first circuit package to the second circuit package via another transfer line.

13. The method according to claim 12, wherein the transfer line includes a bi-directional line.

14. The method according to claim 12, wherein the transfer line comprises at least one first transfer line for the signals and at least one second transfer line for the path operation information.

15. A redundant system comprising:

a redundant structure comprising:

a plurality of connected systems each including a plurality of circuit packages through which signal paths are formed; and a selector connected to said signal paths for selecting a signal path and generating selection information;

generating means for generating path operation information indicative of one of operation and non-operation of each signal path, based on said selection information; and control means provided in each said circuit package for transferring said path operation information from a first circuit package to a second circuit package in a direction reverse to that of a flow of associated signal paths and for judging path operation condition of the signal paths passing through each circuit package based on said transferred path operation information.

16. The redundant system according to claim 15, wherein said control means comprises:

collecting means for collecting said path operation information from a plurality of circuit packages; and transferring means for transferring said path operation information to predetermined ones of said circuit packages.

17. The redundant system according to claim 16, wherein said control means further comprises:

judgement means for calculating a logical OR of said collected path operation information; and indication means for indicating an operational status of the associated circuit package according to a logical result of the judgement means.

18. The redundant system according to claim 15, wherein said signal paths include transfer lines for connecting circuit packages.

19. The redundant system according to claim 18, wherein any two circuit packages connected by a transfer line transfer signals from said second circuit package to said first circuit package via the transfer line, and transfer said path operation information from said first circuit package to said second circuit package via a different transfer line.

20. The redundant system according to claim 19, wherein said transfer line having means for transferring information in multiple directions.

\* \* \* \* \*